Nov. 6, 1934.  A. BICKELHAUPT ET AL  1,979,663
BALL AND ROLLER BEARING
Filed July 25, 1932

Patented Nov. 6, 1934

1,979,663

UNITED STATES PATENT OFFICE 1,979,663

BALL AND ROLLER BEARING

Adolf Bickelhaupt and Hans Schlienz, Sillenbuch-Stuttgart, Germany, assignors to Friedrich Breuning, Stuttgart, Germany Application July 25, 1932, Serial No. 624,494
In Germany July 28, 1931

10 Claims. (Cl. 308—184)

The main object of the invention is to produce a ball bearing of indicating devices which, in spite of its simplicity, is particuarly characterized by its very low friction and extreme precision.

According to the invention the number of the races of the balls is reduced in that only two ordinary discs are employed as ring and guide ring. The balls run only on the edges of the two discs. According to the invention a tarnishing of the races, for example in damp weather, at changes of temperature and also a soiling of the races is also no longer possible.

The discs which serve as running and guiding ring for the balls may be yieldably mounted by suitably shaped lateral springs, so that a yielding of the balls and also of the running rings in the event of jolts is possible so that a damaging of the running edges is prevented.

The ball bearing can also be constructed as roller bearing when rollers run between the running rings instead of balls. The rollers are specially constructed and have conical ends, which run on the inner edges of the two discs. The conical ends of the points are slightly rounded which run on one side on the axle shoulder. Owing to the conical ends, the rollers can assume an inclined position within a certain limit on the running rings so that the running axle can also run inclined in the roller bearing. The running discs can also be yieldably and resiliently mounted so that the axle is elastically supported in all directions.

Several embodiments of the invention are illustrated by way of example in the accompanying drawing in which:—

Figure 1:
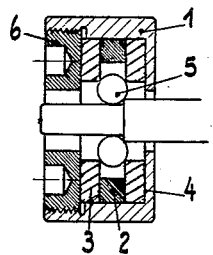
Fig. 1 shows in longitudinal section a bearing with rigid running discs.
Figure 2:
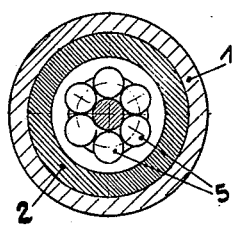
Fig. 2 is a cross section of Fig. 1.

In a casing 1 two discs 3 and 4 are rigidly mounted and hold together the balls 5. Discs 3 and 4 are held at a distance apart by a ring 2. A nut 6 is screwed into the casing 1 and unites the whole, the ring 2 preventing a shifting of the two discs 3 and 4 and at the same time enables the whole to be tightly screwed together. A dropping out of the balls is not impossible if the bearing is pulled off the axle.

Figure 3:
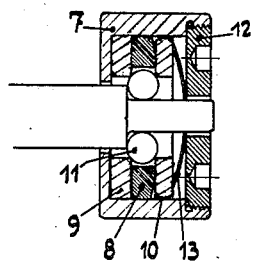
Fig. 3 shows in longitudinal section a bearing with spring mounted running disc on one side.
Figure 4:
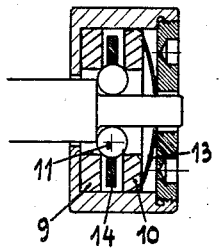
Fig. 4 is a modified form of Fig. 3 in which the balls are held at a distance apart by a disc.
Figure 5:
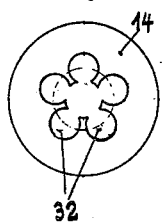
Fig. 5 is a front elevation of the holding disc for the balls.

So as to ensure smooth and easy running in spite of jolts and vibrations and at high speeds a cushion, such as a spring disc 13 (Fig. 3) is inserted between a nut 12 and a race ring 10. Thus, in the event of the slightest jolts or jars towards the axle and in the event of vibrations, the spring 13 can yield and the disc 10 running on the inner side of the balls 11 can yield so that the balls likewise yield and transmit the jolt to the intermediate ring 8. The spring 13 is so strong that it can at all times withstand the weight resting on the bearing.

It is known in connection with rotating machine parts that the two bearings (shoulder bearings and the like) must be mutually placed on an axle with a slight amount of play, in order to enable the axle to expand on heating. This play, however, often results in considerable noise at certain speeds.

Figure 6:
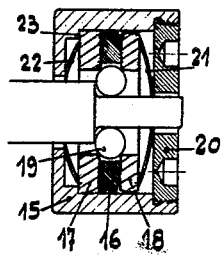
Fig. 6 shows in longitudinal section a construction with spring mounted running rings on both sides.
Figure 7:
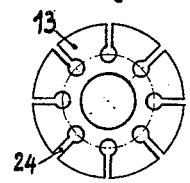
Figs. 7 and 8 show the spring which acts on the race rings.
Figure 8:
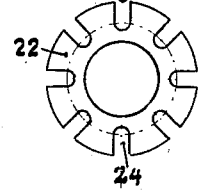
Figure 9:
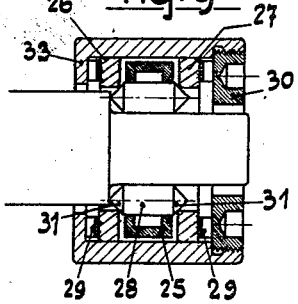
Fig. 9 is a longitudinal section through a roller bearing.
Figure 10:
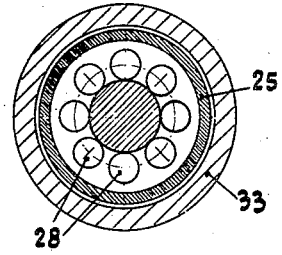
Fig. 10 is a cross-section of Fig. 9.
Figure 11:
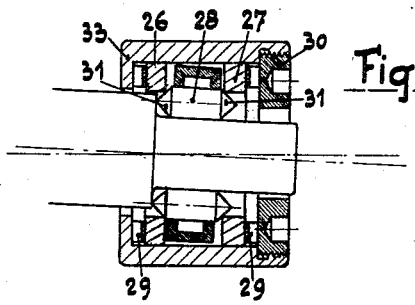
Fig. 11 shows a ball bearing with inclined running axle.

The spring 22 (Fig. 6) serves for overcoming this objection. This spring enables the two bearings of an axle to be mutually adjusted under light pressure. By interposing this spring 22, the axle can take place under heat so that an absolutely smooth and silent running is possible. In the casing 15 the two discs 17 and 18 are concentrically guided and hold together the balls 19 and at the same time form with their inner edges the running edges for the balls 19. The intermediate ring 16 serves as spacing element and for supporting the balls in the event of jolts and the like. By screwing the nut 20 into the casing 15 the parts are securely held in the casing. The spring 22 is under compression whereas the disc 17 bears on the shoulder 23 or projection.

The discs 10 and 18 are slightly crowned or bulged on their outer surfaces, whereas the distance spacing discs 8 and 16 are bevelled on their outer surfaces directed towards the discs 10 and 18, so that the discs 10 and 18 can easily assume an inclined position. The springs 13 and 22 are of dish-shape and provided with any desired number of radial slots 24 to improve the cushioning.

A disc 14 may be provided for holding the balls 11, instead of the spacing rings 8 and 16. This disc 14 is provided with recesses 32 for accommodating the balls 11, which recesses hold the balls at certain distances apart.

In the case of roller bearings the rollers 28 have conical ends 31 which run on the inner edges of the rings 26, 27. The rollers 28 are held apart by a cage 25. The race rings 26 and 27 are supported by springs 29. These springs 29 are arranged on one side between the casing 33 and the ring 26 and on the other side between the ring 27 and the nut 30 or cover. The roller bearing may be made with or without the spring 29.

This roller bearing is intended chiefly for use where in the known ball bearings at high speeds and heavy stressing the balls on the axles or ring sleeves run in and thus detrimentally affect the life. By means of this roller bearing the rolling elements assume a position at an angle to the axle without affecting the bearing, so that the disadvantages of the known roller bearings are overcome. As is known, the roller bearings only in exceptional instances can be arranged and mounted concentrically to one another with the result that a jamming of the rolling elements takes place owing to the inclining of the axles, which has no detrimental effect in the bearing according to the invention.

We claim:—

1. A bearing, comprising in combination a casing open at one end and having a wall with a central bore at the other end, a shaft extending through said bore into said casing, two sharp edged rings loosely inserted in said casing and surrounding said shaft, a screw plug having a central bore screwed into the open end of said casing and holding said rings in said casing, said plug having a central bore allowing the passage of said shaft, and rolling elements between said shaft and said rings and adapted to roll on the adjacent sharp edges of said rings.

2. A bearing, comprising in combination a casing open at one end and having a wall with a central bore at the other end, a shaft extending through said bore into said casing, two sharp-edged rings loosely inserted in said casing and surrounding said shaft, a spacing ring between said two rings, a screw plug having a central bore screwed into the open end of said casing and holding said rings in said casing, said plug having a central bore allowing the passage of said shaft, and rolling elements between said shaft and said rings and adapted to roll on the adjacent sharp edges of said rings.

3. A bearing, comprising in combination a casing open at one end and having a wall with a central bore at the other end, a shaft extending into said casing through said bore, two sharp-edged rings inserted in said casing and surrounding said shaft, a screw plug screwed into the open end of said casing and having a central bore allowing the passage of said shaft, a spring arranged between said plug and its adjacent ring and adapted to press said ring towards the other ring, and rolling elements between said shaft and said rings and adapted to roll on the adjacent sharp edges of said rings.

4. A bearing, comprising in combination a casing open at one end and having a wall with a central bore at the other end, a shaft extending into said casing through said bore, two sharp-edged rings inserted in said casing and surrounding said shaft, a screw plug screwed into the open end of said casing and having a central bore allowing the passage of said shaft, an annular shoulder in said casing near said end wall adapted to form an abutment for one of said rings, a spring between said end wall and adjacent ring adapted to press this ring towards the other ring, and rolling elements between said shaft and said rings and adapted to roll on the adjacent sharp edges of said rings.

5. A bearing, comprising in combination a casing open at one end and having a wall with a central bore at the other end, a shaft extending into said casing through said bore, a screw plug screwed into said casing and having a central bore fitting over said shaft, two sharp-edged rings loosely inserted in said casing and surrounding said shaft, a spring between said end wall and one of said rings, a second spring between said plug and the other of said rings, and rolling elements between said shaft and said rings adapted to roll on the adjacent sharp edges of said rings.

6. A bearing, comprising in combination a casing open at one end and having a wall with a central bore at the other end, a shaft extending into said casing through said bore, two sharp edged rings loosely mounted in said casing, a screw plug having a central bore screwed into said casing and surrounding said shaft, a recessed disc between said rings, and balls in the recesses of said disc adapted to run on said shaft and on the adjacent sharp edges of said rings.

7. A bearing, comprising in combination a casing open at one end and having a wall with a central bore at the other end, a shaft extending into said casing through said bore, two sharp edged rings loosely mounted in said casing, a screw plug having a central bore screwed into said casing and surrounding said shaft, a recessed disc between said rings, and rollers with tapered ends in the recesses of said disc adapted to run on said shaft and on the adjacent sharp edges of said rings.

8. A bearing, comprising in combination a casing open at one end and having a wall with a central bore at the other end, a shaft having a shoulder and extending into said casing through said bore, two sharp edged rings loosely mounted in said casing, a screw plug having a central bore screwed into said casing and surrounding said shaft, a recessed disc between said rings, and rollers with tapered ends in the recesses of said disc adapted to run on said shaft and on the adjacent sharp edges of said rings, said rollers having a slightly rounded point at one tapered end, said point adapted to bear against the shoulder of said shaft.

9. A bearing, comprising in combination a casing open at one end and having a wall with a central bore at the other end, a shaft extending through said bore into said casing, two sharp edged rings loosely inserted in said casing and surrounding said shaft, a screw plug having a central bore screwed into the open end of said casing and surrounding said shaft, rolling elements between said shaft and said rings adapted to run on said shaft and the adjacent sharp edges of said rings, and at least one spring disc with radial slots in said casing adapted to press said rings against said rolling elements.

10. A bearing, comprising in combination a casing open at one end and having a wall with a central bore at the other end, a shaft extending through said bore into said casing, two sharp edged rings loosely inserted in said casing and surrounding said shaft, a screw plug having a central bore screwed into the open end of said casing and surrounding said shaft, rolling elements between said shaft and said rings adapted to run on said shaft and the adjacent sharp edges of said rings, and at least one corrugated resilient ring-shaped disc adapted to resiliently press said rings against said rolling elements.

ADOLF BICKELHAUPT.
HANS SCHLIENZ.